(12) United States Patent
Lin et al.

(10) Patent No.: US 10,378,583 B1
(45) Date of Patent: Aug. 13, 2019

(54) HIGH-SPEED BALL BEARING AND BALL RETAINER

(71) Applicant: TUNG PEI INDUSTRIAL CO., LTD., Taipei (TW)

(72) Inventors: Li-Chuan Lin, Taoyuan (TW); Bo-Rong Lee, Taipei (TW)

(73) Assignee: TUNG PEI INDUSTRIAL CO., LTD., Taipei (TW)

( * ) Notice: Subject to any disclaimer, the term of this patent is extended or adjusted under 35 U.S.C. 154(b) by 0 days.

(21) Appl. No.: 16/160,089

(22) Filed: Oct. 15, 2018

(30) Foreign Application Priority Data

Feb. 26, 2018 (TW) .............................. 107202618 U

(51) Int. Cl.
| | |
|---|---|
| *F16C 33/38* | (2006.01) |
| *F16C 33/32* | (2006.01) |
| *F16C 33/66* | (2006.01) |
| *F16C 33/44* | (2006.01) |

(52) U.S. Cl.
CPC .......... *F16C 33/3887* (2013.01); *F16C 33/32* (2013.01); *F16C 33/3806* (2013.01); *F16C 33/44* (2013.01); *F16C 33/664* (2013.01); *F16C 33/6607* (2013.01)

(58) Field of Classification Search
CPC .............. F16C 33/3806; F16C 33/3875; F16C 33/3887; F16C 33/44; F16C 33/6607; F16C 33/664
See application file for complete search history.

(56) References Cited

U.S. PATENT DOCUMENTS

| | | | | |
|---|---|---|---|---|
| 3,839,531 | A * | 10/1974 | Parkinson | ........... B29C 45/2628 264/262 |
| 8,939,044 | B2 * | 1/2015 | Ueno | ...................... F16C 19/06 74/458 |
| 2012/0251025 | A1 * | 10/2012 | Haizmann | ............. F16C 19/163 384/513 |

* cited by examiner

*Primary Examiner* — Phillip A Johnson
(74) *Attorney, Agent, or Firm* — Li & Cai Intellectual Property (USA) Office

(57) ABSTRACT

A high-speed ball bearing includes an outer ring, an inner ring, a plurality of balls, and a ball retainer. The ball retainer includes a plurality of pocket holes for arranging a plurality of balls, an inner circumferential surface of each of the pocket holes have a spherical surface is coaxial to the ball. A gap between an outer circumferential surface of the ball retainer and an inner circumferential surface of the ring is defined as a first gap, and a gap between the pocket hole and the corresponding ball is defined as a second gap. The first gap and the second gap have the following relationship: $W2=(W1-r')\times A$.

11 Claims, 6 Drawing Sheets

HIGH-SPEED BALL BEARING AND BALL RETAINER

CROSS-REFERENCE TO RELATED PATENT APPLICATION

This application claims the benefit of priority to Taiwan Patent Application No. 107202618, filed on Feb. 26, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a ball bearing and a ball retainer, and more particularly to a high-speed ball bearing and a ball retainer each applied to a high-speed rotating shaft.

BACKGROUND OF THE DISCLOSURE

Since a ball bearing has a good operating performance, which includes a high load, a low frictional resistance, a small rotational deflection, and a high rigidity, a high-speed rotating system generally uses the ball bearing as a support member for supporting a rotating shaft. This can prevent high-speed rotation of the high-speed rotating system from causing temperature rise and friction loss issues.

With the rapid development of related industries such as the machinery industry or the aviation industry, one of the current trends in industrial development includes promotion of the rotational speed of the rotating shaft and improvement of the working efficiency of the rotating system. Moreover, with the development of mechanical processing technology, the precision requirements of the rotating shaft have gradually increased, so that the high-speed performance and the precision of the ball bearing need to be improved for achieving the requirements of the rotational speed and precision of the mechanical rotating shaft.

The high-speed performance and precision of the ball bearing are not only affected by the material and machining precision of the ball bearing, but also affected by the structure of the ball bearing. A typical ball bearing includes an outer ring, an inner ring, a plurality of balls, and a ball retainer. The ball retainer is used to separate the balls from each other, so that the balls can be arranged on ball tracks between the inner ring and the outer ring and spaced apart from each other, and each two of the balls arranged adjacent to each other have the same angle with respect to the central axis. The ball retainer is approximately in an annular shape and includes a plurality of pocket holes that are in an annular arrangement for receiving the balls, and each two of the pocket holes arranged adjacent to each other have the same angle with respect to an axis and are spaced apart from each other. In order to allow the balls to be rollable in the pocket holes of the ball retainer, and a diameter of each of the pocket holes of the ball retainer needs to be larger than an outer diameter of the corresponding ball. However, a gap will exist between each of the pocket holes of the ball retainer and the corresponding ball. Accordingly, when the ball bearing is in operation, the ball retainer and the balls can still be movable relative to each other.

Generally, the conventional ball retainer has two guiding modes. One of the two guiding modes is a steel ball guiding mode, which usually does not consider that the ball bearing is prone to deflect and interfere with the balls under a high-speed operation. The other guiding mode is an outer ring guiding mode, and can be used to stabilize, balance, and reduce the deflection under a high-speed operation. However, the ball retainer of the outer ring guiding mode will brush against the outer ring under a low speed operation so that the ball bearing in each of the two guiding modes is met with increased resistance during operation and generates additional vibrations, affecting the stability and precision of the ball bearing operation.

SUMMARY OF THE DISCLOSURE

In response to the above-referenced technical inadequacies, the present disclosure provides a high-speed ball bearing and a ball retainer to effectively improve the issues associated with conventional ball bearings. Specifically, the issues associated with the conventional ball bearings includes that the ball retainer is easily deflected under a high-speed rotation to generate vibration, and the ball retainer may be in abnormal contact with an outer ring under a low-speed rotation.

In one aspect, the present disclosure provides a high-speed ball bearing, which includes an outer ring, an inner ring, a plurality of balls, and a ball retainer. The outer ring has an outer ring track surface arranged on an inner circumferential surface thereof, and the inner circumferential surface of the outer ring has an outer ring shoulder arranged around a central axis of the ball bearing. A diameter of an inner circumferential surface of the outer ring shoulder is smaller than a diameter of an inner circumferential surface of the outer ring track surface. The inner ring has an inner ring track surface arranged on an outer circumferential surface thereof. The balls are rollably disposed between the outer ring track surface and the inner ring track surface and are spaced apart from each other, and each two of the balls arranged adjacent to each other have the same angle with respect to the central axis of the ball bearing. The ball retainer is arranged between the inner circumferential surface of the outer ring and the outer circumferential surface of the inner ring, and the ball retainer includes a first ring portion and a second ring portion, which are configured to be arranged around the central axis of the ball bearing. A diameter of an outer circumferential surface of the first ring portion is larger than a diameter of an outer circumferential surface of the second ring portion, and a diameter of an inner circumferential surface of the first ring portion is larger than or equal to a diameter of an outer circumferential surface of the second ring portion. The ball retainer further includes a plurality of pocket holes, the pocket holes are in an annular arrangement between the first ring portion and the second ring portion, and each two of the pocket holes arranged adjacent to each other have the same angle with respect to the central axis of the ball bearing, and are spaced apart from each other. The positions and diameters of the pocket holes correspond to the positions and diameters of the balls, so that the balls can be arranged in the pocket holes. When the balls roll between the outer ring track surface and the inner ring track surface, each two of the balls are maintained at a distance from each other and have the same angle with respect to the central axis of the ball bearing. The outer circumferential surface of the first ring portion of the ball retainer is adjacent to the inner circumferential surface of the outer ring shoulder. A gap between the first ring portion and the inner circumferential surface of the outer ring shoulder is defined as a first gap, and a gap between the inner circumferential surface of each of the pocket holes and the corresponding ball is defined as a second gap. The first gap and the second gap have the following relationship: $W2 = (W1-r') \times A$. $W1$ represents a width of the first gap. $W2$ represents a width of the second gap. $r'$ is an expansion variable of a radius of the ball retainer generated by the ball bearing being rotated at a predetermined speed. $A$ represents an amplification factor, and when a product value DmN obtained by multiplying the pitch diameter Dm of the high-speed ball bearing and a predetermined allowable rotation speed N is 1,600,000, the amplification factor is within a range of 1.2 to 1.5.

In certain embodiments, the present disclosure provides a high-speed ball bearing. Each of the pocket holes is formed by a first notch arranged on one side of the first ring portion and a second notch arranged on the second ring portion. In each of the pocket holes, an inner circumferential surface of the first notch and an inner circumferential surface of the second notch face toward each other. The first notch has a first spherical surface arranged on the inner circumferential surface thereof, and the second notch has a second spherical surface arranged on the inner circumferential surfaces thereof. In each of the pocket holes and the corresponding ball, a center of the ball defines an imaginary spherical surface, a diameter of the imaginary spherical surface is larger than a diameter of the ball, and the first spherical surface and the second spherical surface are arranged on the imaginary spherical surface.

In certain embodiments, the present disclosure provides a high-speed ball bearing, where the width of the second gap is within a range of 0.3 mm to 0.5 mm.

In certain embodiments, the present disclosure provides a high-speed ball bearing. The ball retainer and the balls are immersed into a lubricating oil during rotation.

In certain embodiments, the present disclosure provides a high-speed ball bearing, where the amplification factor is 1.4.

In certain embodiments, the present disclosure provides a high-speed ball bearing, where the ball retainer is made of a resin material or a nylon material.

In one aspect, the present disclosure provides a ball retainer for being arranged in the high-speed ball bearing.

Therefore, the advantageous effects of the present disclosure are that an interference of the ball retainer on the ball during high-speed operation can be effectively reduced, and a deflection of the ball retainer can be effectively avoided, such that the stability of the ball bearing can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
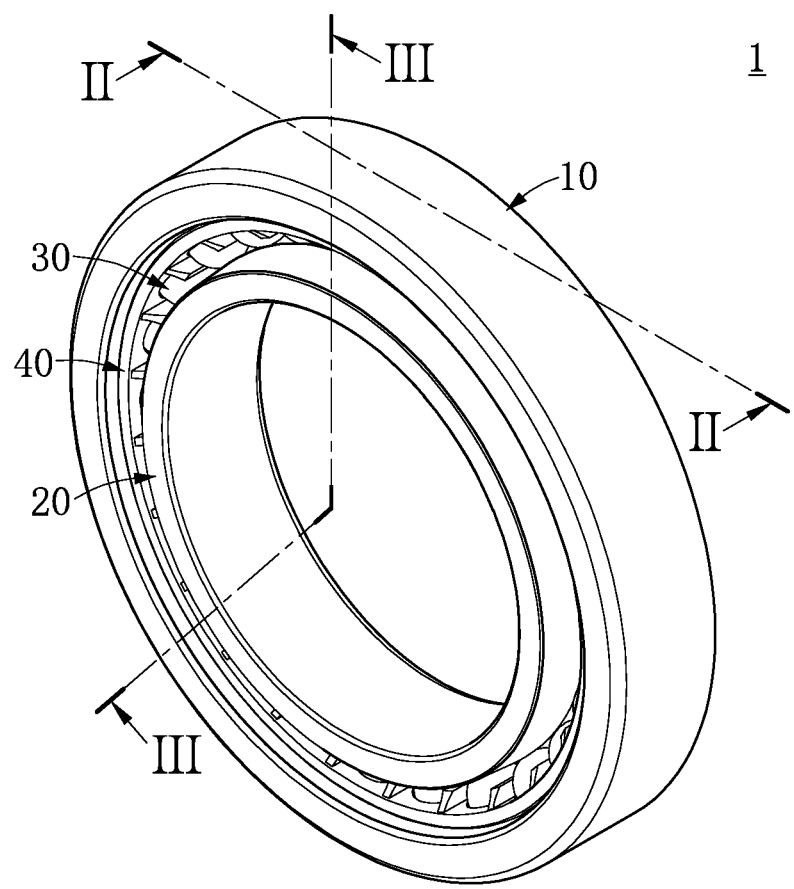
FIG. 1 is a perspective view of a high-speed ball bearing according to an exemplary embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
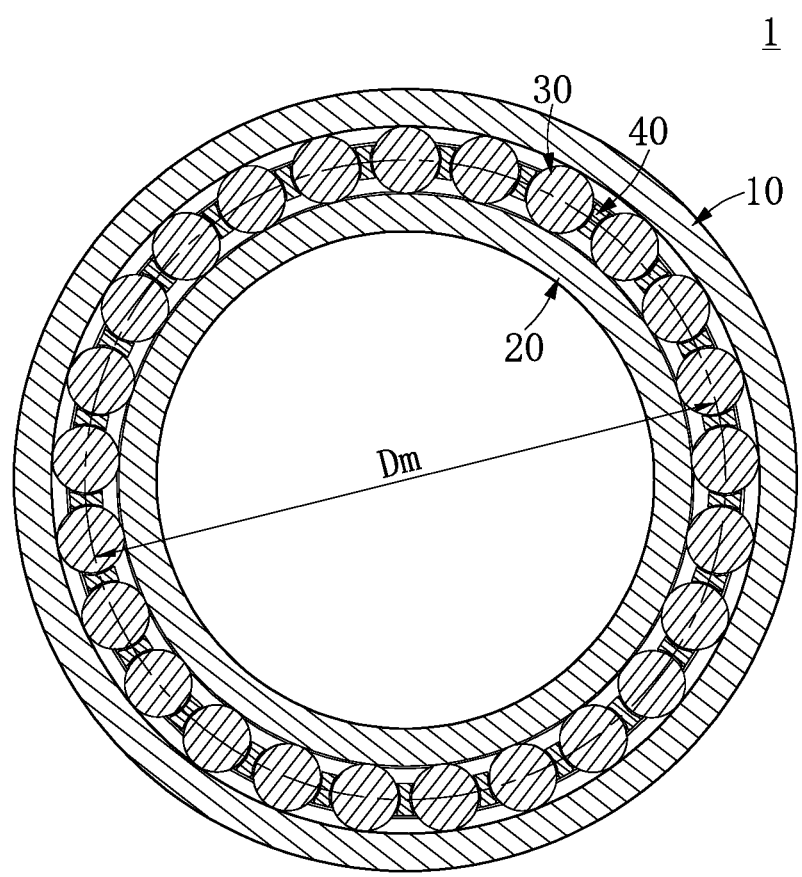
FIG. 2 is a cross-sectional view taken along line II-II of FIG. 1.
Figure 3:
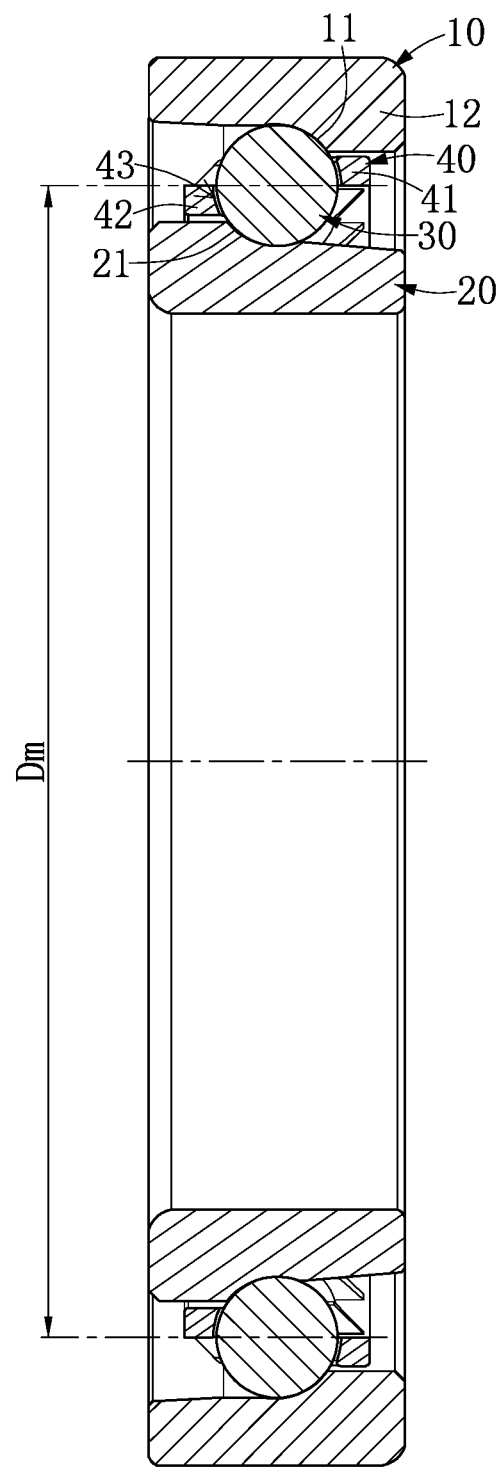
FIG. 3 is a cross-sectional view taken along line III-III of FIG. 1.

Referring to FIG. 1 to FIG. 3, an exemplary embodiment of the present disclosure provides a high-speed ball bearing 1 that includes an outer ring 10, an inner ring 20, a plurality of balls 30, and a ball retainer 40.

As shown in FIG. 3, the outer ring 10 is annular in shape, and has an outer ring track surface 11 arranged on an inner circumferential surface thereof. The outer ring 10 has an outer ring shoulder 12 that is arranged on one side of the inner circumferential surface of the outer ring 10 around a longitudinal axis of the ball bearing 1. A diameter of an inner circumferential surface of the outer ring shoulder 12 is smaller than a diameter of an inner circumferential surface of the outer ring track surface 11, and is smaller than a diameter of the inner circumferential surface of the outer ring 10.

The inner ring 20 has an outer circumferential surface, and a diameter of the outer circumferential surface of the inner ring 20 is smaller than a diameter of the inner circumferential surface of the outer ring shoulder 12. The inner ring 20 has an inner ring track surface 21 arranged on the outer circumferential surface thereof, and the inner ring track surface 21 faces the outer ring track surface 11. The balls 30 are arranged between the outer ring 10 and the inner ring 20. The balls 30 are rollably disposed between the outer ring track surface 11 and the inner ring track surface 21. The ball retainer 40 is arranged between the inner circumferential surface of the outer ring 10 and the outer circumferential surface of the inner ring 20. Since the balls 30 are disposed between the outer ring track surface 11 and the inner ring track surface 21 by the ball retainer 40, the balls 30 are spaced apart from each other, and each two of the balls 30 arranged adjacent to each other have the same angle with respect to the central axis of the ball bearing 1.

Figure 4:
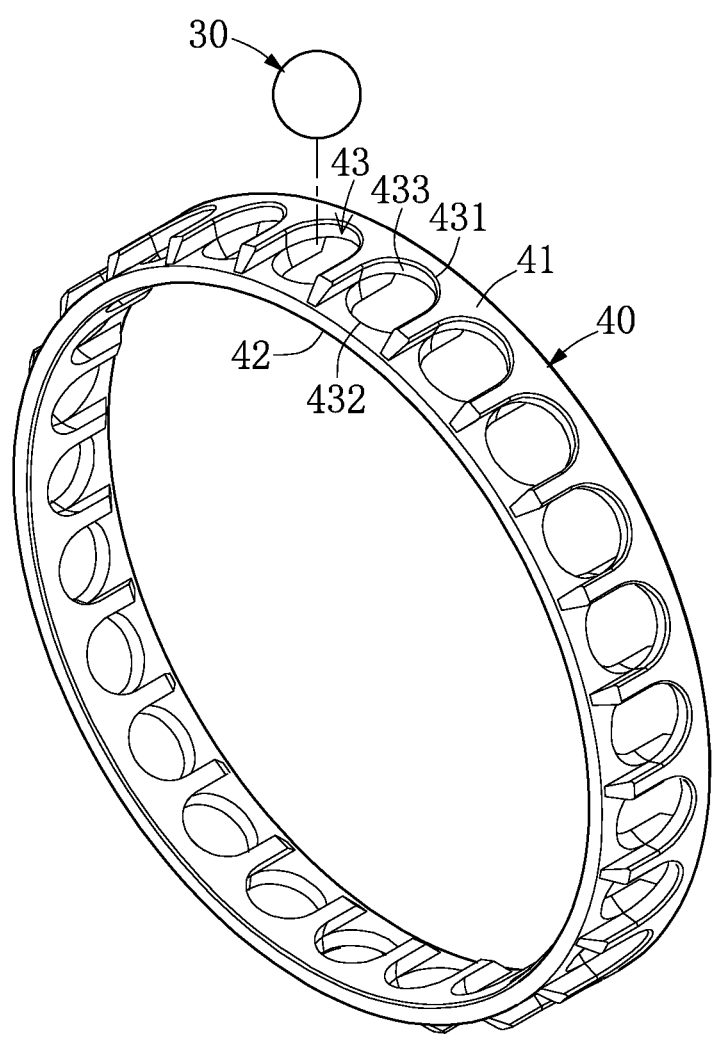
FIG. 4 is a perspective view of a ball retainer according to the exemplary embodiment of the present disclosure.
Figure 5:
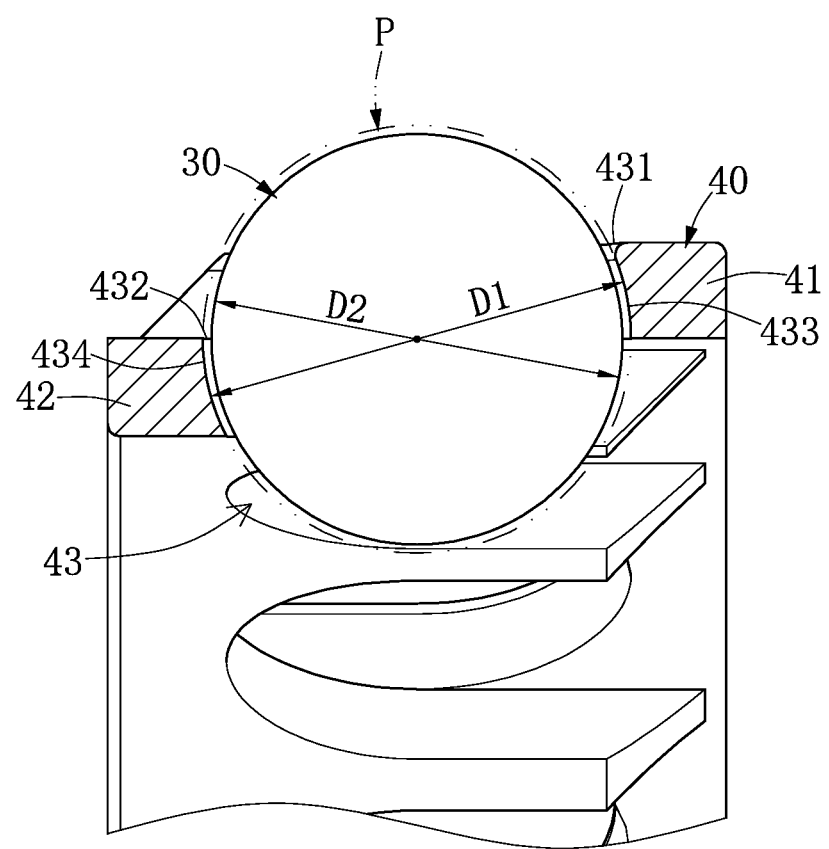
FIG. 5 is a partial-enlarged view of a pocket hole of the ball retainer according to the exemplary embodiment of the present disclosure.

Referring to FIG. 4 and FIG. 5, the ball retainer 40 of the present embodiment is preferably made of a resin material or a nylon material. Further, the ball retainer 40 is approximately in an annular shape, and includes a first ring portion 41 and a second ring portion 42. The first ring portion 41 and the second ring portion 42 are arranged sequentially around a longitudinal axis of the ball bearing 1, and are connected to each other. A diameter of an outer circumferential surface of the first ring portion 41 is larger than a diameter of an outer circumferential surface of the second ring portion 42. A diameter of an inner circumferential surface of the first ring portion 41 is larger than or equal to a diameter of the outer circumferential surface of the second ring portion 42. In the present embodiment, the diameter of the inner circumferential surface of the first ring portion 41 is equal to the diameter of the outer circumferential surface of the second ring portion 42, so that the inner circumferential surface of the first ring portion 41 and the outer circumferential surface of the second ring portion 42 are integrally connected to each other.

The ball retainer 40 includes a plurality of pocket holes 43. The pocket holes 43 are formed on the ball retainer 40 in an annular arrangement, and each two of the pocket holes 43 arranged adjacent to each other have the same angle with respect to the central axis of the ball bearing 1, and are spaced apart from each other. A diameter and a position of each of the pocket holes 43 correspond to a diameter and a position of each of the balls 30, and the balls 30 are rollably received in the pockets 43. Specifically, when the balls 30 roll between the outer ring track surface 11 and the inner ring track surface 21, each two of the balls 30 are maintained at a distance from each other and to have the same angle with respect to the central axis of the ball bearing 1.

In the present embodiment, the pocket holes 43 are arranged on the ball retainer 40 at a position between the first ring portion 41 and the second ring portion 42. Each of the pockets 43 is formed by a first notch 431 arranged on one side of the first ring portion 41 and a second notch 432 arranged on the second ring portion 42. In the present embodiment, an inner circumferential surface of the first notch 431 and an inner circumferential surface of the second notch 432 face toward each other so as to jointly define the pocket hole 43 in a circular shape, so that the balls 30 are respectively disposed in the pocket holes 43.

As shown in FIG. 5, which is a partial-enlarged view of the ball retainer 40, the first notch 431 has a first spherical surface 433 arranged on the inner circumferential surface thereof, and the second notch 432 has a second spherical surface 434 arranged on the inner circumferential surface thereof. In each of the pocket holes 43 and the corresponding ball 30 of the present embodiment, the first spherical surface 433 and the second spherical surface 434 face toward each other, a center of the ball 30 defines an imaginary spherical surface P having a diameter D1 that is larger than a diameter D2 of the ball 30, and the first spherical surface 433 and the second spherical surface 434 are arranged on the imaginary spherical surface P. Accordingly, when the balls 30 are disposed in the pocket holes 43, a gap can be maintained between the first spherical surface 433 and the second spherical surface 434 of the pocket hole 43 and the ball 30, thereby allowing the ball 30 to be rollable in the pocket hole 43.

Figure 6:
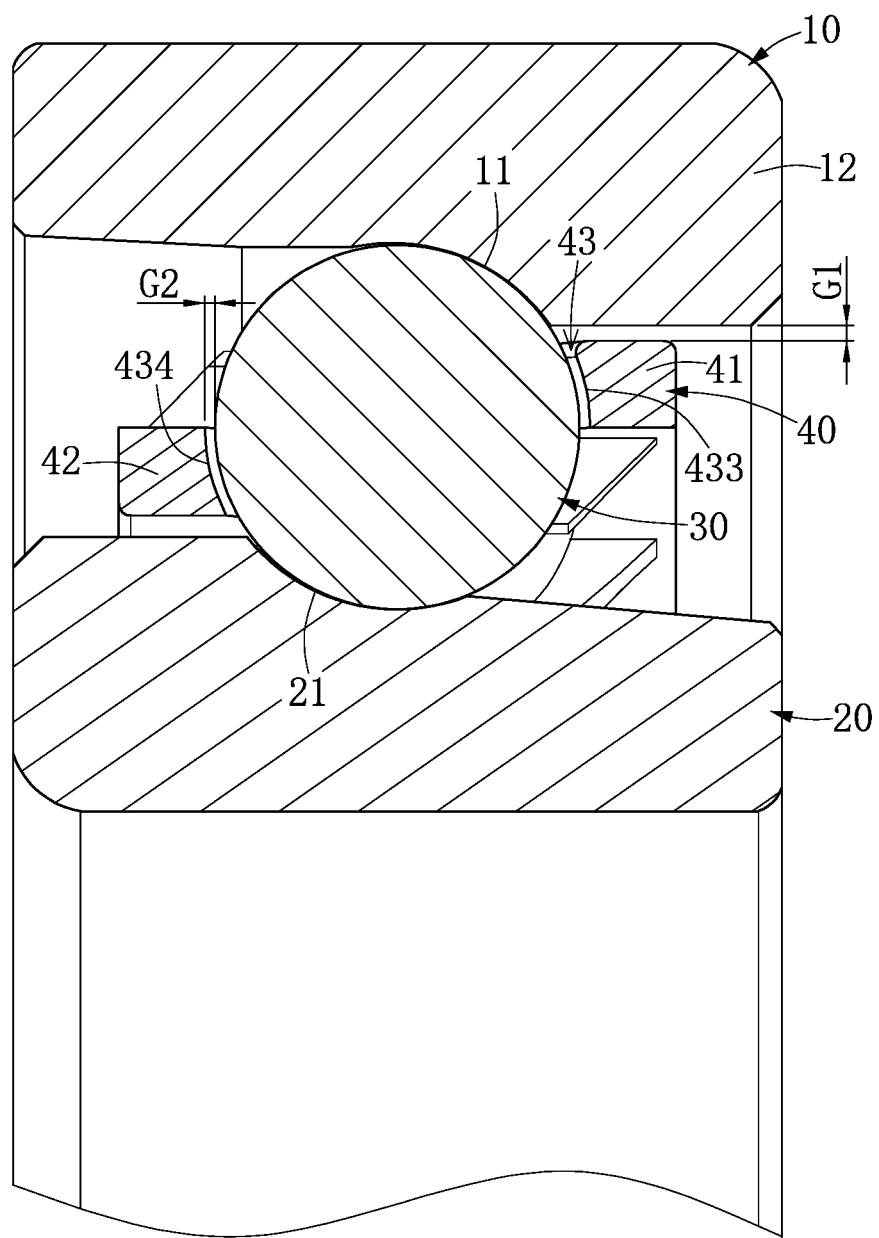
FIG. 6 is a partial-enlarged view of the high-speed ball bearing showing the pocket hole of the ball retainer according to the exemplary embodiment of the present disclosure.

Referring to FIG. 6, which shows the components of the high-speed ball bearing 1 being in an assembled state, the outer circumferential surface of the first ring portion 41 of the ball retainer 40 is arranged adjacent to the inner circumferential surface of the outer ring shoulder 12 of the outer 10. Moreover, a first gap G1 is formed between the outer circumferential surface of the first ring portion 41 and the inner circumferential surface of the outer ring shoulder 12, and a second gap G2 is formed between the first spherical surface 433 and the second spherical surface 434 of the inner circumferential surface of each of the pocket holes 43 of the ball retainer 40 and the ball 30. A size of the first gap G1 and a size of the second gap G2 are formed at a specific ratio. When the high-speed ball bearing 1 is rotated at a predetermined allowable rotational speed, the interference between the ball retainer 40 and the balls 30 can be reduced, and the vibration and the unbalanced state generated by the ball retainer 40 under a high-speed rotation can be reduced. Accordingly, the stability of the high-speed ball bearing 1 of the present disclosure under high-speed rotation can be improved.

In the present embodiment, the relationship between the first gap G1 and the second gap G2 of the present disclosure can be expressed by the following relational formula: $W2=(W1-r')\times A$.

W1 represents a width of the first gap. W2 represents a width of the second gap r' is an expansion variable of a radius of the ball retainer generated by the high-speed ball bearing 1 rotated at a predetermined speed. A represents an amplification factor, the amplification factor in the present embodiment is within a range of 1.2 to 1.5.

In the above relational formula, the width W2 of the second gap G2 needs to be determined, and the width W2 of the second gap G2 is preferably within a range of 0.3 mm to 0.5 mm. In practice, the high-speed ball bearing 1 can be lubricated by grease infiltration, spraying, oil gas, or other manners, so that the ball retainer 40 and the balls 30 can be covered with the lubricating grease. When the width W2 of the second gap G2 of the high-speed ball bearing 1 is within the range of 0.3 mm to 0.5 mm, the ball 30 and the inner circumferential surface (e.g., the first spherical portion 433 and the second spherical portion 434) of the pocket hole 43 of the ball retainer 40 have enough space there-between to receive the lubricating grease under a high-speed rotation. Thereby, the inner circumferential surface of the pocket hole 43 and the ball 30 can be buffered by the lubricating grease, so that the pocket holes 43 of the ball retainer 40 do not directly contact and interfere with the balls 30.

After the width W2 of the second gap G2 is determined, a value of the expansion variable r' needs to be determined. The expansion variable r' refers to the amount of expansion deformation of a radius of the outer circumferential surface of the ball retainer 40 generated by the centrifugal force and the vibration factor when the ball retainer 40 is rotated at a predetermined allowable rotational speed N, and the expansion variable r' can be calculated by the following formula:

r'=(r2−r1), in which r1 is an original radius of the ball retainer 40 before rotation, and r2 is a radius of the ball retainer 40 when the high-speed ball bearing 1 is at the predetermined allowable rotation speed N.

It should be noted that, the predetermined allowable rotational speed N is a highest rotational speed that can be withstood by the high-speed ball bearing 1, and the predetermined allowable rotational speed N varies with a pitch diameter Dm of the ball bearing (as shown in FIGS. 2 and 3). That is, the high-speed ball bearing 1 of the present disclosure can calculate the expansion variable r' of the ball retainer 40 under a condition that a product value DmN, obtained by multiplying the pitch diameter Dm of the high-speed ball bearing 1 and the predetermined allowable rotation speed N, is 1,600,000. In other words, before the expansion variable r' is measured or calculated, the product value range of the predetermined allowable rotation speed N can be obtained by a relationship formula of Dm×N=1,600,000, and then the expansion variable r' is measured or calculated according to the product value range of the predetermined allowable rotational speed N.

The expansion variable r' of the ball retainer 40 can be obtained by actual measurement or computer simulation. If the expansion variable r' is measured by actual measurement, a test sample of the ball retainer 40 is produced. Next, the test sample of the ball retainer 40 is assembled with the outer ring 10, the inner ring 20, and the ball 30 to form a test sample of the high-speed ball bearing 1. Then, the test sample of the high-speed ball bearing 1 is tested by being rotated at a predetermined allowable rotational speed N through a test machine, an actual outer diameter of the test sample of the ball retainer 40 is obtained in a high-speed rotation state, and the radius r2 of the test sample of the ball retainer 40 under a state of high-speed rotation is measured and obtained. Finally, the radius r2 of the test sample of the ball retainer 40 is subtracted by the original radius r1 of the test sample of the ball retainer 40 so as to obtain the expansion variable r'.

On the other hand, if the expansion variable r' is calculated by the computer simulation, the parameters of sizes, material weights, elastic modulus of the ball retainer 40, and diameters and numbers of the balls 30 are input into a simulation software, and the expansion variable r' of the ball retainer 40 when under high-speed rotation at the predetermined allowable rotational speed N can be calculated.

When the width W2 of the second gap G2 is determined and the expansion variable r' of the ball retainer 40 is calculated, the width W1 of the first gap G1 between the outer circumferential surface of the ball retainer 40 and the inner circumferential surface of the outer ring shoulder 12 can be calculated according to the formula of W2=(W1−f)× A. Then, a diameter of the inner circumferential surface of the outer ring shoulder 12 is subtracted by the width W1 of the first gap G1 so as to obtain a diameter of the outer circumferential surface of the ball retainer 40. Specifically, in the formula, A is an amplification factor, and when a product value DmN obtained by multiplying the pitch diameter Dm of the high-speed ball bearing and a predetermined allowable rotation speed N is 1,600,000, the amplification factor A is within a range of 1.2 to 1.5, and the amplification factor A is preferably 1.4.

According to the above description, a diameter of the outer circumferential surface of the ball retainer 40 of the present disclosure can be determined, and a width of the first gap G1 between the outer circumferential surface of the ball retainer 40 and the inner circumferential surface of the outer ring shoulder 12 can be determined, so that the diameter of the outer circumferential surface of the ball retainer 40 can be formed with an optimum size for achieving a state of dynamic equilibrium.

It should be noted that, the ball retainer 40 of the present disclosure being in the state of dynamic equilibrium under high-speed rotation means that when the high-speed ball bearing 1 is rotated at a high rotational speed and the ball retainer 40 is rotated together with the balls 30, the ball retainer 40 can be suspended at a position between the inner circumferential surface of the outer ring 10 and the outer circumferential surface of the inner ring 20. The ball retainer 40 can achieve the state of dynamic equilibrium by reasons described as follows. When the balls 30 drive the ball retainer 40 to rotate around the central axis of the ball bearing 1, the ball retainer 40 may bounce in unspecified directions with respect to the inner circumferential surface of the outer ring 10. However, when the rotational speed of the ball bearing 1 is increased, the bounce frequency of the ball retainer 40 with respect to the inner circumferential surface of the outer ring 10 will be increased, and the diameter of the outer circumferential surface of the ball retainer 40 will become larger. Moreover, when the ball bearing 1 is rotated at a high speed, the width of the first gap G1 within the inner circumferential surface of the outer ring shoulder 12 is reduced. Therefore, when the ball bearing 1 is in a state of high rotational speed, the ball retainer 40 will have an intense and rapid bounce frequency within the inner circumferential surface of the outer ring 10, so that the ball retainer 40 can be stably suspended between the inner circumferential surface of the outer ring 10 and the outer circumferential surface of the inner ring 20 to achieve the state of dynamic equilibrium.

In conclusion, the advantages of the present disclosure are described as follows. A ball retainer 40 having a special design is disposed in the high-speed ball bearing 1 of the present disclosure, and when the high-speed ball bearing 1 is rotated at a high speed, the balls 30 and the inner circumferential surface of the pocket holes 43 of the ball retainer 40 have enough space there-between to receive the lubricating grease, the ball retainer 40 can be suspended at a position between the inner circumferential surface of the outer ring 10 and the outer circumferential surface of the inner ring 20. Thereby, an interference of the ball 30 affected by the ball retainer 40 during high-speed rotation can be effectively reduced, and a deflection of the ball retainer 40 can be effectively avoided, such that the stability of the high-speed ball bearing 1 can be effectively improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A high-speed ball bearing, comprising:
    an outer ring having an outer ring track surface arranged on an inner circumferential surface of the outer ring, the inner circumferential surface having an outer ring shoulder arranged around a central axis of the ball bearing, wherein a diameter of an inner circumferential surface of the outer ring shoulder is smaller than a diameter of an inner circumferential surface of the outer ring track surface;

an inner ring having an inner ring track surface arranged on an outer circumferential surface of the inner ring;

a plurality of balls rollably disposed between the outer ring track surface and the inner ring track surface, wherein the balls are spaced apart from each other, and each two of the balls arranged adjacent to each other have the same angle with respect to the central axis of the ball bearing; and a ball retainer arranged between the inner circumferential surface of the outer ring and the outer circumferential surface of the inner ring, the ball retainer including a first ring portion and a second ring portion, wherein the first ring portion and the second ring portion are arranged around the central axis of the ball bearing, a diameter of an outer circumferential surface of the first ring portion is larger than a diameter of an outer circumferential surface of the second ring portion, and a diameter of an inner circumferential surface of the first ring portion is larger than or equal to a diameter of an outer circumferential surface of the second ring portion, wherein the ball retainer includes a plurality of pocket holes that are in an annular arrangement between the first ring portion and the second ring portion, and each two of the pocket holes arranged adjacent to each other have the same angle and are spaced apart from each other with respect to the central axis of the ball bearing, wherein the positions and diameters of the pocket holes correspond to the positions and diameters of the balls, so that the balls are arranged in the pocket holes, and when the balls roll between the outer ring track surface and the inner ring track surface, each adjacent two of the balls are maintained at a distance from each other and have the same angle with respect to the central axis of the ball bearing;

wherein the outer circumferential surface of the first ring portion of the ball retainer is adjacent to the inner circumferential surface of the outer ring shoulder, a gap between the first ring portion and the inner circumferential surface of the outer ring shoulder is defined as a first gap, and a gap between the inner circumferential surface of each of the pocket holes and the corresponding ball is defined as a second gap, wherein the first gap and the second gap have the following relationship:

$W2=(W1-r')\times A$; wherein W1 represents a width of the first gap; W2 represents a width of the second gap; r' is an expansion variable of a radius of the ball retainer generated by the ball bearing being rotated at a predetermined speed; A represents an amplification factor, and wherein when a product value DmN obtained by multiplying the pitch diameter Dm of the high-speed ball bearing and a predetermined allowable rotation speed N is 1,600,000, the amplification factor is within a range of 1.2 to 1.5.

2. The high-speed ball bearing according to claim 1, wherein each of the pocket holes is formed by a first notch arranged on one side of the first ring portion and a second notch arranged on the second ring portion, wherein in each of the pocket holes, an inner circumferential surface of the first notch and an inner circumferential surface of the second notch face toward each other, the first notch has a first spherical surface arranged on the inner circumferential surface of the first notch, and the second notch has a second spherical surface arranged on the inner circumferential surfaces of the second notch, wherein in each of the pocket holes and the corresponding ball, a center of the ball defines an imaginary spherical surface, a diameter of the imaginary spherical surface is larger than a diameter of the ball, and the first spherical surface and the second spherical surface are arranged on the imaginary spherical surface.

3. The high-speed ball bearing according to claim 2, wherein the width of the second gap is within a range of 0.3 mm to 0.5 mm.

4. The high-speed ball bearing according to claim 3, wherein the ball retainer and the balls are covered with a lubricating oil during rotation.

5. The high-speed ball bearing according to claim 3, wherein the amplification factor is 1.4.

6. The high-speed ball bearing according to claim 3, wherein the ball retainer is made of a resin material or a nylon material.

7. A ball retainer for being arranged in a ball bearing that includes a plurality of balls, wherein the ball bearing includes an outer ring and an inner ring, and the outer ring has an outer ring track surface arranged on an inner circumferential surface of the outer ring that has an outer ring shoulder arranged around a central axis of the inner circumferential surface of the outer ring of the ball bearing, wherein a diameter of an inner circumferential surface of the outer ring shoulder is smaller than a diameter of an inner circumferential surface of the outer ring track surface, and the inner ring has an inner ring track surface arranged on an outer circumferential surface of the inner ring, wherein the balls are rollably disposed between the outer ring track surface and the inner ring track surface, the balls are spaced apart from each other, and each two of the balls arranged adjacent to each other have the same angle with respect to the central axis of the ball bearing; the ball retainer comprising;

a first ring portion and a second ring portion that are configured to be arranged around a central axis of the ball bearing, wherein a diameter of an outer circumferential surface of the first ring portion is larger than a diameter of an outer circumferential surface of the second ring portion, and a diameter of an inner circumferential surface of the first ring portion is larger than or equal to a diameter of an outer circumferential surface of the second ring portion; and a plurality of pocket holes being in an annular arrangement between the first ring portion and the second ring portion, wherein each two of the pocket holes arranged adjacent to each other have the same angle with respect to the central axis of the ball retainer, and are spaced apart from each other, wherein the positions and diameters of the pocket holes correspond to the positions and diameters of the balls, so that the balls are respectively arranged in the pocket holes, and when the balls roll between the outer ring track surface and the inner ring track surface, and each adjacent two of the balls are maintained at a distance from each other and have the same angle with respect to the central axis of the ball bearing;

wherein the outer circumferential surface of the first ring portion of the ball retainer is arranged adjacent to the inner circumferential surface of the outer ring shoulder, a gap between the first ring portion and the inner circumferential surface of the outer ring shoulder is defined as a first gap, and a gap between the inner circumferential surface of each of the pocket holes and the corresponding ball is defined as a second gap, wherein the first gap and the second gap have the following relationship:

$W2=(W1-f')\times A$; wherein W1 represents a width of the first gap; W2 represents a width of the second gap; r' is an expansion variable of a radius of the ball retainer generated by the ball bearing being rotated at a predetermined speed; A represents an amplification factor, and wherein when a product value DmN obtained by multiplying the pitch diameter Dm of the high-speed ball bearing and a predetermined allowable rotation speed N is 1,600,000, the amplification factor is within a range of 1.2 to 1.5.

8. The ball retainer according to claim 7, wherein each of the pocket holes is formed by a first notch arranged on one side of the first ring portion and a second notch arranged on the second ring portion, wherein in each of the pocket holes, an inner circumferential surface of the first notch and an inner circumferential surface of the second notch face toward each other, the first notch has a first spherical surface arranged on the inner circumferential surface of the first notch, and the second notch has a second spherical surface arranged on the inner circumferential surfaces of the second notch, wherein in each of the pocket holes and the corresponding ball, a center of the ball defines an imaginary spherical surface, and the first spherical surface and the second spherical surface are arranged on the imaginary spherical surface.

9. The ball retainer according to claim 8, wherein the width of the second gap is within a range of 0.3 mm to 0.5 mm.

10. The ball retainer according to claim 8, wherein the amplification factor is 1.4.

11. The ball retainer according to claim 8, wherein the ball retainer is made of a resin material or a nylon material.

* * * * *